United States Patent
Nomura

(10) Patent No.: US 8,385,733 B2
(45) Date of Patent: Feb. 26, 2013

(54) IMAGE PICKUP APPARATUS

(75) Inventor: Hiroshi Nomura, Saitama (JP)

(73) Assignee: Hoya Corporation, Tokyo (JP)

( * ) Notice: Subject to any disclaimer, the term of this patent is extended or adjusted under 35 U.S.C. 154(b) by 266 days.

(21) Appl. No.: 13/010,259

(22) Filed: Jan. 20, 2011

(65) Prior Publication Data

US 2011/0181768 A1    Jul. 28, 2011

(30) Foreign Application Priority Data

Jan. 28, 2010   (JP) ................................ 2010-016449

(51) Int. Cl.
*G03B 17/00* (2006.01)
(52) U.S. Cl. .......................................... 396/89; 396/439
(58) Field of Classification Search ................ 396/72, 396/79, 89, 439
See application file for complete search history.

(56) References Cited

U.S. PATENT DOCUMENTS

| | | | |
|---|---|---|---|
| 6,978,089 B2 | 12/2005 | Nomura et al. | |
| 7,458,735 B2 * | 12/2008 | Souma et al. | 396/351 |
| 7,671,917 B2 * | 3/2010 | Izukawa | 348/340 |
| 7,777,976 B2 | 8/2010 | Nomura et al. | |
| 7,864,458 B2 | 1/2011 | Sasaki | |
| 8,081,251 B2 * | 12/2011 | Kido et al. | 348/333.11 |
| 8,233,052 B2 * | 7/2012 | Augusto | 348/207.99 |

FOREIGN PATENT DOCUMENTS

| | | |
|---|---|---|
| JP | 3771909 | 2/2006 |
| JP | 2009-217243 | 9/2009 |
| JP | 2009-251063 | 10/2009 |

\* cited by examiner

*Primary Examiner* — W. B. Perkey
(74) *Attorney, Agent, or Firm* — Greenblum & Bernstein P.L.C.

(57) ABSTRACT

An image pickup apparatus includes an image sensor and a photographing optical system. An imaging surface of the image sensor includes an effective light-receiving area having a rectangular shape that is defined by short sides and long sides. An optical surface of a lens that is provided closest to the image plane within the photographing optical system and which possesses an imaging function has a non-circular shape in a front elevational view. A boundary of the non-circular optical surface of the lens that is provided closest to the image plane includes two pairs of mutually parallel sides so that, when the lens that is provided closest to the image plane is rotated about the optical axis relative to the imaging surface, an image area formed by the non-circular optical surface covers the rectangular effective light-receiving area of the imaging surface before and after rotation.

8 Claims, 9 Drawing Sheets

IMAGE PICKUP APPARATUS

BACKGROUND OF THE INVENTION

1. Field of the Invention

The invention relates to an image pickup apparatus, and more particularly, relates to an image pickup apparatus having characteristic features with respect to a lens (group) that is disposed closest to the image plane.

2. Description of the Related Art

Lens barrels, in which the length thereof in the optical axis direction can be reduced (to enable a slimmer design) in a fully-retracted state (accommodated state), that are suitable for a portable optical apparatus such as a camera, etc., have been proposed by the inventors of the present invention in Japanese Patent No. 3,771,909 and Japanese Unexamined Patent Publication No. 2009-251063.

In an image pickup apparatus provided with the above-mentioned lens barrel, a focus lens group of a photographing optical system is disposed closest to the image plane (image pickup device/image sensor). In general, since the focus lens group is circular as seen in a front elevational view, an image shape (image circle) formed by the photographing optical system including the focus lens group is circular. Whereas, since a light-receiving surface (area) of the image sensor has an aspect ratio of 4:3, i.e., a rectangular shape, an optical region (area) which does not contribute to the formation of an object image in the light-receiving surface exists within the image circle. If the image formed by the photographing optical system has a size and shape capable of covering the light-receiving surface of the image sensor, the image need not necessarily be circular. In the related art, an image pickup apparatus is known in which the lens group that is provided closest to the image plane is formed into a rectangular shape in a front elevational view (when viewed in the optical axis direction), similar to the shape of the image sensor, by eliminating the optical region of the lens group which does not contribute to the formation of the object image on the rectangular light-receiving surface from the front elevational circular shape thereof. In this manner, the unnecessary optical region is eliminated from the circular lens, so that it is possible to achieve a small-sized (miniaturized) and light-weight image pickup apparatus.

On the other hand, it has been desirable for such image pickup apparatuses to be assembled in the state where the lens barrel (the entirety thereof or only the focus lens group) is rotated by 90 degrees about the optical axis relative to the image sensor in accordance with to the shape, the specification, etc., of the mounted optical apparatus. However, although the front elevation of the focus lens group is a rectangle corresponding to the aspect ratio of the rectangular light-receiving surface of the image sensor, since the contour of the image formed by the image pickup apparatus is also rectangular, if the focus lens group is rotated by 90 degrees about the optical axis, the contour of the image is also rotated by 90 degrees, so that a portion of the light-receiving surface of the image sensor in the longitudinal direction exceeds the contour of the image. Conventionally, in order to satisfy the desire to assemble the image pickup apparatus by rotating the lens barrel (focus lens group) relative to the image pickup device, a focus lens group having a circular shape in a front elevational view must be used, so that the desire for a small-sized and light-weight apparatus cannot be satisfied.

SUMMARY OF THE INVENTION

The present invention has been devised with consideration of the above-described problem and provides an image pickup apparatus capable of being assembled at a different rotational position about an optical axis with respect to an imaging surface while achieving further miniaturization and a reduction in weight of the lens group that is disposed closest to the image-plane side.

According to an aspect of the present invention, an image pickup apparatus is provided, including an image sensor and a photographing optical system, the image pickup apparatus forming an object image obtained through the photographing optical system onto an imaging surface of the image sensor. The imaging surface includes an effective light-receiving area having a rectangular shape that is defined by short sides and long sides. An optical surface of a lens that is provided closest to the image plane within the photographing optical system and which possesses an imaging function has a non-circular shape in a front elevational view. A boundary of the non-circular optical surface of the lens that is provided closest to the image plane includes two pairs of mutually parallel sides so that, upon the lens that is provided closest to the image plane being rotated about the optical axis relative to the imaging surface, an image area formed by the non-circular optical surface covers the rectangular effective light-receiving area of the imaging surface before and after rotation.

In the case where a circular lens having a circular optical surface that forms an image circle circumscribed about the rectangular effective light-receiving area is disposed at the same position as that of the lens that is provided closest to the image plane and has the same refractive power as that of the lens that is provided closest to the image plane, a distance between each of the two pairs of mutually parallel sides of the non-circular optical surface is smaller than a diameter of the circular optical surface of the circular lens.

It is desirable for the two pairs of mutually parallel sides included in the boundary of the non-circular optical surface of the lens that is provided closest to the image plane are formed so that, upon the lens that is provided closest to the image plane being rotated by 90 degrees about the optical axis relative to the imaging surface, the image area formed by the non-circular optical surface covers the rectangular effective light-receiving area of the imaging surface.

It is desirable for the distances between the two pairs of mutually parallel sides that define the boundary of the non-circular optical surface of the lens that is provided closest to the image plane to be different from each other, wherein one of the distances between the two pairs of mutually parallel sides is 1.2 times larger than the other of the distances between the two pairs of mutually parallel sides.

It is desirable for the front elevational outer shape of the non-circular optical surface of the lens that is provided closest to the image plane to remain the same upon being rotated by a predetermined angle about the optical axis.

It is desirable for the predetermined angle to be 90 degrees, and for the front elevational outer shape of the non-circular optical surface of the lens that is provided closest to the image plane to have a substantially square shape.

It is desirable for the lens that is provided closest to the image plane to comprise a focusing lens for carrying out a focus adjustment.

In an embodiment, a digital camera is provided including the image pickup apparatus having the above-described structure.

In the image pickup apparatus according to the present invention, since the image area formed by the non-circular optical surface of the lens that is provided closest to the imaging surface includes a pair of mutually parallel sides that cover (both before and after the rotation) the rectangular effective light-receiving area of the imaging surface when the boundary of this non-circular optical surface is rotated together with the lens provided closest to the imaging surface about the optical axis relative to the imaging surface, even if the lens provided closest to the imaging surface and the imaging surface are rotated relative to each other for assembly purposes, a normal image having no vignetting can be formed on the effective light-receiving area of the image pickup apparatus.

The present disclosure relates to subject matter contained in Japanese Patent Application No. 2010-16449 (filed on Jan. 28, 2010), which is expressly incorporated herein by reference in its entirety.

DESCRIPTION OF THE EMBODIMENTS

Figure 1:
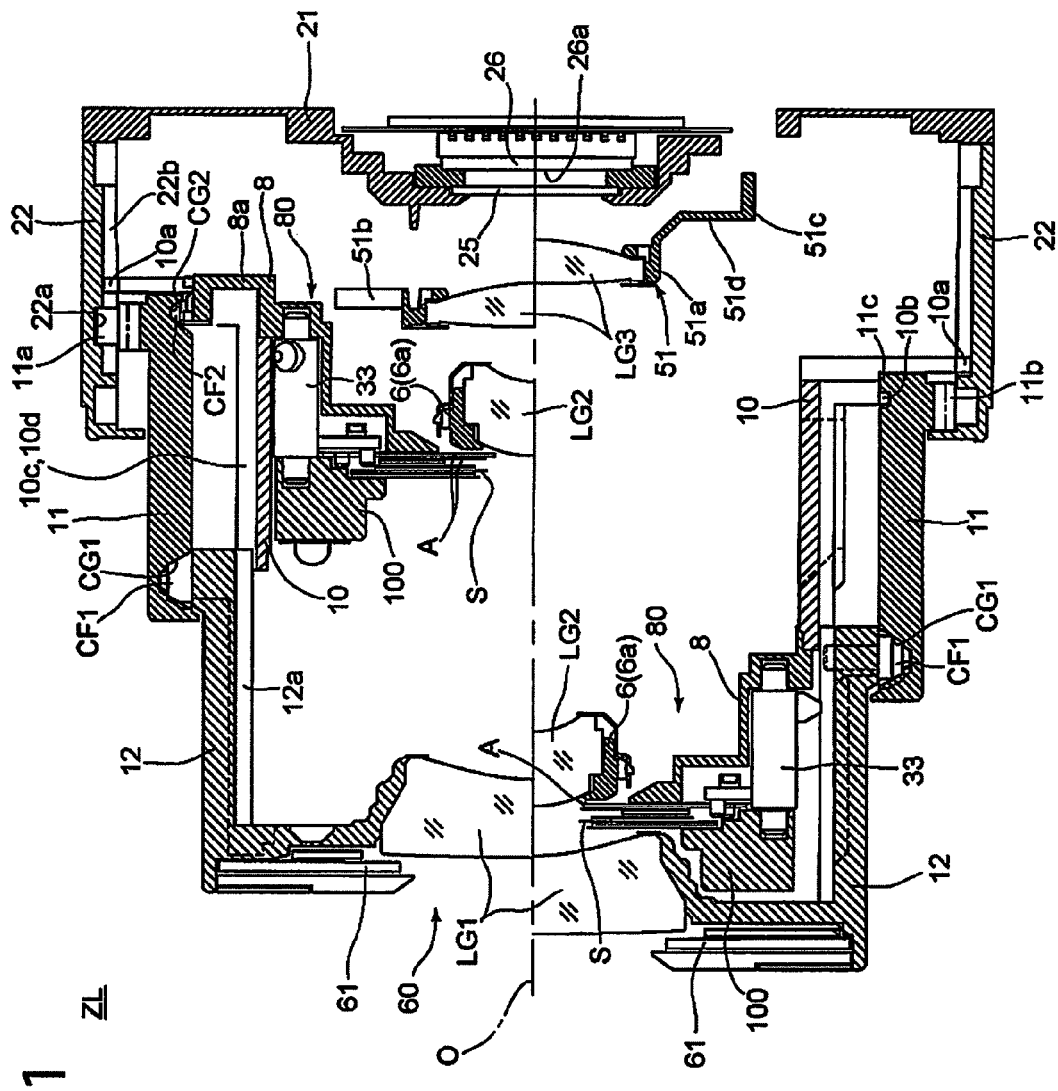
FIG. 1 is a cross-sectional view illustrating a ready-to-photograph state (zoom range) of a zoom lens barrel having an image pickup apparatus according to an embodiment of the invention.
Figure 2:
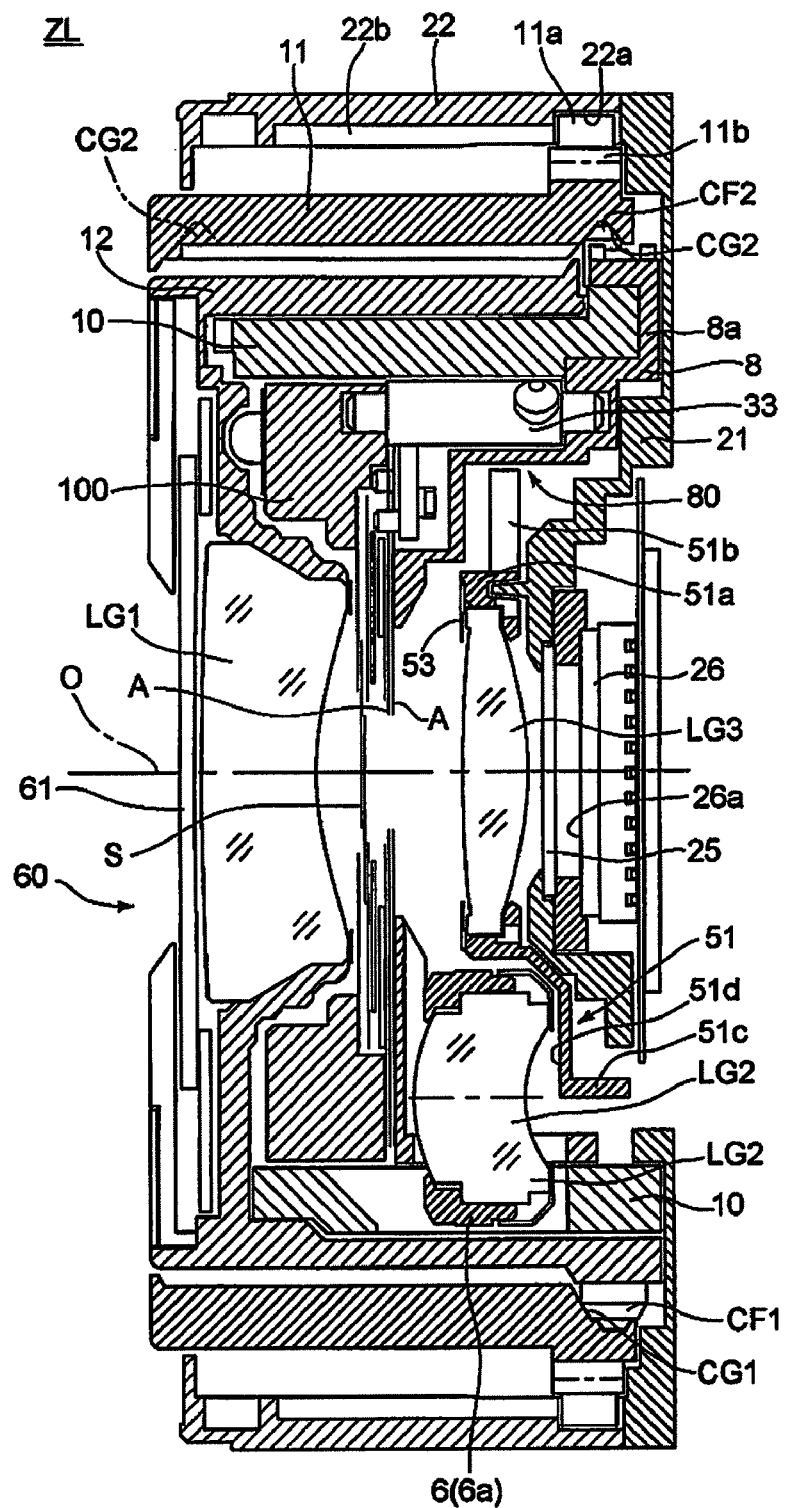
FIG. 2 is a cross-sectional view illustrating an accommodated (fully-retracted) state of the zoom lens barrel.

FIGS. 1 and 2 illustrate a retractable (collapsing type) zoom lens barrel ZL according to an embodiment of the present invention. An image pickup apparatus in the zoom lens barrel ZL includes a first lens group LG1, a shutter (supported member/intermediate optical element) S, a variable aperture diaphragm (supported member/intermediate optical element/photographing aperture forming member) A, a second lens group (insertable/removable optical element) LG2, a third lens group (the lens provided closest to the image plane) LG3, a lowpass filter 25, and an image sensor (image pickup device) 26, in that order from the object side. The first lens group LG1, the shutter S, the variable aperture diaphragm A, the second lens group LG2, and the third lens group LG3 constitute a photographing optical system. In the description hereinafter, an optical axis direction denotes a direction along or parallel to the optical axis O of the image pickup apparatus, a front side denotes the object side (subject side) in the optical axis direction, and a rear side denotes the image plane side, with respect to the optical axis direction. An effective light-receiving area 26a of the image sensor (imaging surface) 26 has a rectangular shape. When a camera attached with the retractable zoom lens barrel ZL is aligned in the normal position, the long sides of the effective light-receiving area 26a extend in the longitudinal direction (horizontal direction).

The zoom lens barrel ZL is provided with a substantially cylindrical-shaped housing 22 that constitutes a stationary member. An image sensor holder (rear member) 21 is fixed to the rear portion of the housing 22. The lowpass filter 25 and the image sensor 26 are formed as one unit which is fixed to the front surface of the image sensor holder 21.

Figure 3:
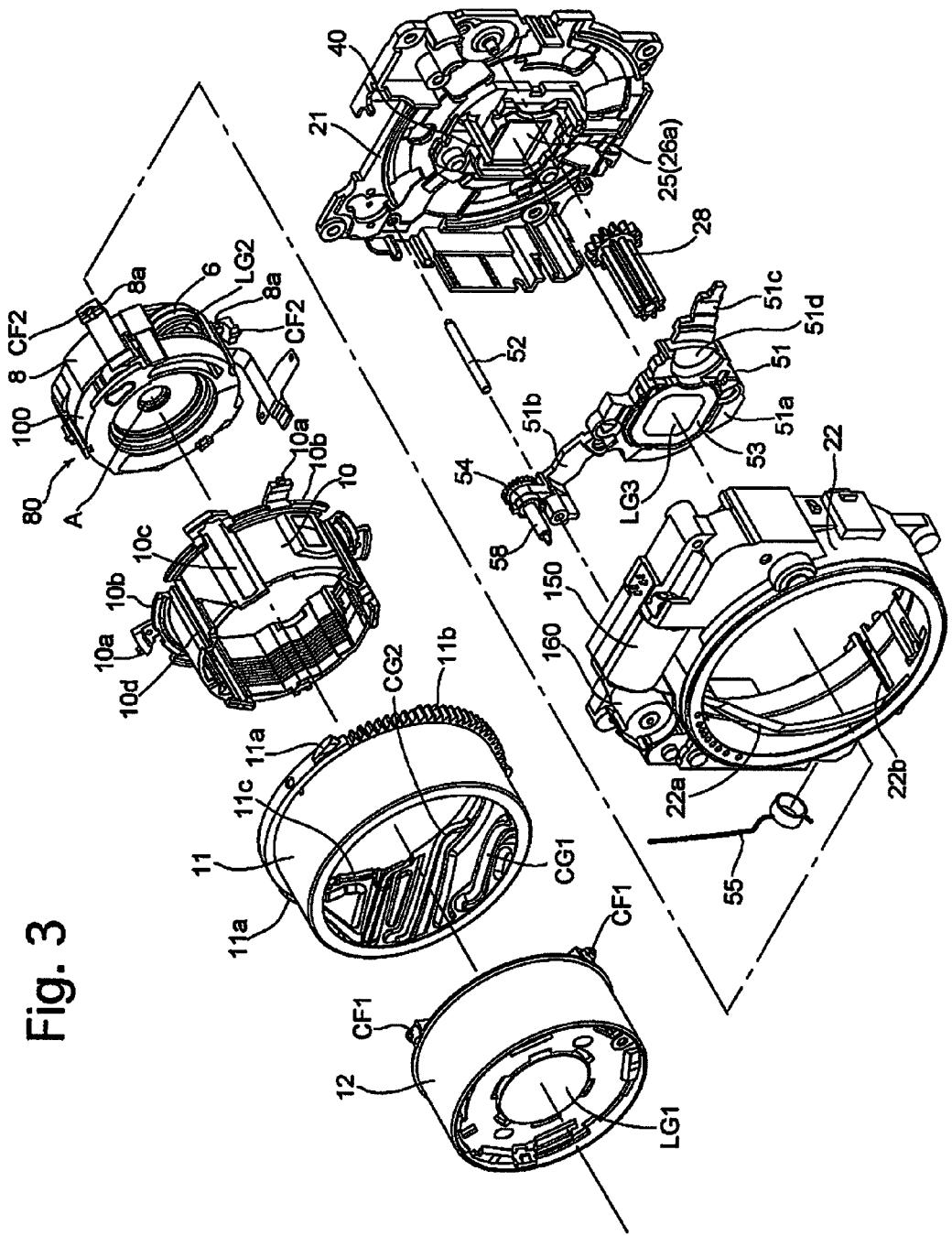
FIG. 3 is an exploded perspective view illustrating main components of the zoom lens barrel.

The third lens group LG3 has a positive refractive power and constitutes the lens that is provided closest to the image plane within the zoom lens barrel ZL. In addition, the third lens group LG3 is a focus lens group. As illustrated in FIG. 3, a third-lens-group frame 51 includes a lens holding cylindrical portion 51a which holds the third lens group LG3 and a pair of guide arms 51b and 51c which extend from the lens holding cylindrical portion 51a in outer radial directions. A second-lens-group receiving recess 51d, in which the second lens group LG2 that is held by a second-lens-group holding frame (insertable/removable member) 6 can be supported, is formed at a boundary portion between the lens holding cylindrical portion 51a and the guide arm 51c. A guide shaft 52 is fixed to the housing 22 and the image sensor holder 21 is inserted into a guide hole formed in the guide arm 51b. The third-lens-group frame 51 is supported by the guide shaft 52 so as to be linearly movable in the optical axis direction. An anti-rotation portion provided at the outer radial end of the other guide arm 51c is engaged with a rotation prevention portion (not shown) formed inner side of the housing 22, so that the rotation of the third-lens-group frame 51 is prevented. The third-lens-group frame is biased forwardly in the optical axis direction by a third-lens-group biasing spring 55, which is configured of a torsion spring that is supported on an outer surface of the housing 22 to abut against an AF nut 54, thereby restricting the forward movement of the AF nut 54. The AF nut 54 is screw-engaged with a lead screw 58, so that the AF nut 54 is moved in the optical axis direction by rotating the lead screw 58 via an AF motor 160. Accordingly, the third-lens-group frame 51 is moved in the optical axis direction by driving the AF motor 160.

In addition to a support and driving unit (configured of the guide shaft 52, guide arms 51b and 51c, third-lens-group biasing spring 55, AF nut 54, lead screw 58 and AF motor 160, etc.) of the third-lens-group frame 51, a zoom unit which is driven and controlled by a zoom motor 150 (FIG. 3) is also supported in the housing 22. As illustrated in FIG. 3, the zoom unit includes a linear guide ring 10, a cam ring 11, a linearly movable barrel 12, and a second-lens-group unit 80.

The cam ring 11 and the linearly movable barrel 12 constitute exterior barrels of the zoom lens barrel ZL. The cam ring 11 is provided with guide protrusions 11a which are slidably inserted into corresponding cam ring guide grooves 22a that are formed in an inner peripheral surface of the housing 22. A driving force of a zoom gear 28 which is driven to be rotated by the zoom motor 150 is received by a gear portion 11b, thereby rotating the cam ring 11. In addition, the cam ring 11 is rotatably moved in the optical axis direction via the guidance of the cam ring guide groove 22a.

The linear guide ring 10 is provided with linear guide protrusions 10a at circumferential positions on the rear end of the outer surface thereof so as to radially extend outwards. The linear guide ring 10 is guided in the optical axis direction to be linearly moved via slidable engagement of the linear guide protrusions 10a with linear guide grooves 22b that are formed in an inner surface of the housing 22. Rotational guide claws 11c are interposed (engaged) between a wall portion which constitutes a base portion of the linear guide protrusions 10a and rotational guide claws 10b, so that the second-lens-group linear guide ring 10 and the cam ring 11 are coupled with each other so as to be integrally movable in the optical axis direction while being relatively rotatable about the optical axis.

The second-lens-group unit 80 is configured so that a shutter unit 100 is supported at the front portion of a second-lens-group moving frame (advancing/retracting member) 8. The second-lens-group unit 80 is linearly guided in the optical axis direction by slidably engaging linear guide keys 8a, which protrude from the second-lens-group moving frame 8 in the outer radial direction, with corresponding linear guide slots 10c. Each linear guide slot 10c is formed in the linear guide ring 10 as a through-hole that is elongated in the optical axis direction. The shutter S is constructed from a plurality of shutter blades that are each supported by a shaft that extends in the optical axis direction.

The shutter S is opened and closed by driving the plurality of shutter blades by an actuator embedded in the shutter unit 100. A variable aperture diaphragm A, the aperture diameter of which changes in accordance with the state of the zoom lens barrel ZL, is provided at a rear position within the shutter unit 100. The variable aperture diaphragm A is configured of a plurality of diaphragm blades that are each supported by a shaft that extends in the optical axis direction. The opening degree of the variable aperture diaphragm A is switched (changed) so that the aperture diameter at the wide-angle extremity (upper half cross-section of FIG. 1) of the zoom range is smaller than the aperture diameter at the telephoto extremity (lower half cross-section of FIG. 1) of the zoom range. However, the aperture diameters at both of these states (i.e., at the wide-angle and telephoto extremities) are configured so that a portion of the second lens group LG2 is permitted to be inserted into the diaphragm aperture. In addition, the second-lens-group holding frame 6 holding the second lens group LG2 is supported in an inner portion of the second-lens-group moving frame 8. The second-lens-group holding frame 6 is supported so as to swing about a rotational shaft 33 that extends in the optical axis direction.

Second-lens-group cam followers CF2 are provided on the outer periphery of the second-lens-group moving frame 8 and are slidably engaged with corresponding second-lens-group control cam grooves CG2 that are formed in an inner circumferential surface of the cam ring 11. The second-lens-group cam followers CF2 are disposed on an outer diameter portion of the linear guide key 8a to protrude to the engagement position with the second-lens-group control cam grooves CG2 through corresponding linear guide slots 10c that extend through the linear guide ring 10 in the radial direction. Since the second-lens-group moving frame 8 (second-lens-group unit 80) is linearly guided in the optical axis direction through the linear guide ring 10, when the cam ring 11 is rotated, the second-lens-group moving frame 8 (second-lens-group unit 80) is moved in a predetermined path in the optical axis direction in accordance with the contours of the second-lens-group control cam grooves CG2.

The first lens group LG1 is supported in the linearly movable barrel 12. The linearly movable barrel 12 is linearly guided in the optical axis direction by slidably engaging linear guide keys 12a (FIG. 1), which are provided on an inner peripheral surface of the linearly movable barrel 12, with corresponding linear guide grooves 10d that are formed on the outer periphery of the linear guide ring 10. In addition, although the linear guide grooves 10d and the linear guide keys 12a, which constitute linear guide mechanisms of the linearly movable barrel 12, and the linear guide slot 10c and the linear guide key 8a, which constitute linear guide mechanisms of the second-lens-group unit 80, are illustrated at the same sectional positions in FIG. 1, the actual circumferential positions of the linear guide mechanisms are different from each other, as can be seen from FIG. 3.

A lens barrier mechanism 61 for opening and closing an aperture 60 is mounted on the front end portion of the linearly movable barrel 12. The lens barrier mechanism 61 is configured to drive the opening and closing of the aperture 60 when the linearly movable barrel 12 is moved forwardly and rearwardly between the accommodated position (accommodated state) and the wide-angle extremity (ready-to-photograph state).

First-lens-group cam followers CF1 that are provided at the rear end of the linearly movable barrel 12 on the outer periphery thereof are slidably engaged with first-lens-group control cam grooves CG1 that are formed in an inner circumferential surface of the cam ring 11. Since the linearly movable barrel 12 is linearly guided in the optical axis direction via the linear guide ring 10, when the cam ring 11 is rotated, the linearly movable barrel 12 is moved in a predetermined path in the optical axis direction in accordance with the contours of the first-lens-group control cam grooves CG1.

The zoom lens barrel ZL having the aforementioned structure is operated as follows. The cam ring 11 is moved in the optical axis direction with respect to the housing 22 upon the zoom motor 150 being driven in the forward/reverse direction in the ready-to-photograph state (zoom range) shown in FIG. 1. The optical axis directional position of the cam ring 11 is controlled by the contours of the cam ring guide grooves 22a. The cam followers CF1 and CF2 are guided by the cam grooves CG1 and CG2 in accordance with the rotation of the cam ring 11, so that the linearly movable barrel 12 supporting the first lens group LG1 and the second-lens-group unit 80 (second-lens-group moving frame 8) supporting the second lens group LG2 are moved relative to each other in the optical axis direction. Therefore, the distance between the first lens group LG1 and the second lens group LG2 is large (long) at the wide-angle extremity shown in the upper half portion of FIG. 1, and the distance between the first lens group LG1 and the second lens group LG2 is small (short) at the telephoto extremity shown in the lower half portion of FIG. 1. Over the entire zoom range from the wide-angle extremity to the telephoto extremity, the second-lens-group holding frame 6 is held at the inserted position (FIG. 1) at which the center of the second lens group LG2 is coincident with the optical axis O.

On the other hand, if the zoom motor 150 is driven from the ready-to-photograph state (more specifically, the wide-angle extremity in the upper half portion of FIG. 1) illustrated in FIG. 1 in the barrel retracting direction, the guide protrusions 11a are guided by the cam ring guide grooves 22a, respectively, so that the cam ring 11 is moved rearward in the optical axis direction while rotating. The linearly movable barrel 12 and the second-lens-group unit 80 (second-lens-group moving frame 8) are moved rearwardly in the optical axis direction, together with the cam ring 11, while performing a predetermined relative movement therebetween in accordance with the contours of the cam grooves CG1 and CG2 of the cam ring 11 which are respectively engaged with the cam followers CF1 and CF2 of the linearly movable barrel 12 and the second-lens-group unit 80, respectively. In addition, if the second-lens-group holding frame 6 together with the second-lens-group moving frame 8 is moved rearwardly in the optical axis direction to approach the image sensor holder 21, the second-lens-group holding frame 6 rotates toward the removed position (i.e., a position at which the second lens group LG2 is removed from the optical axis O) until reaching the removed position (FIG. 2).

Figure 4A:
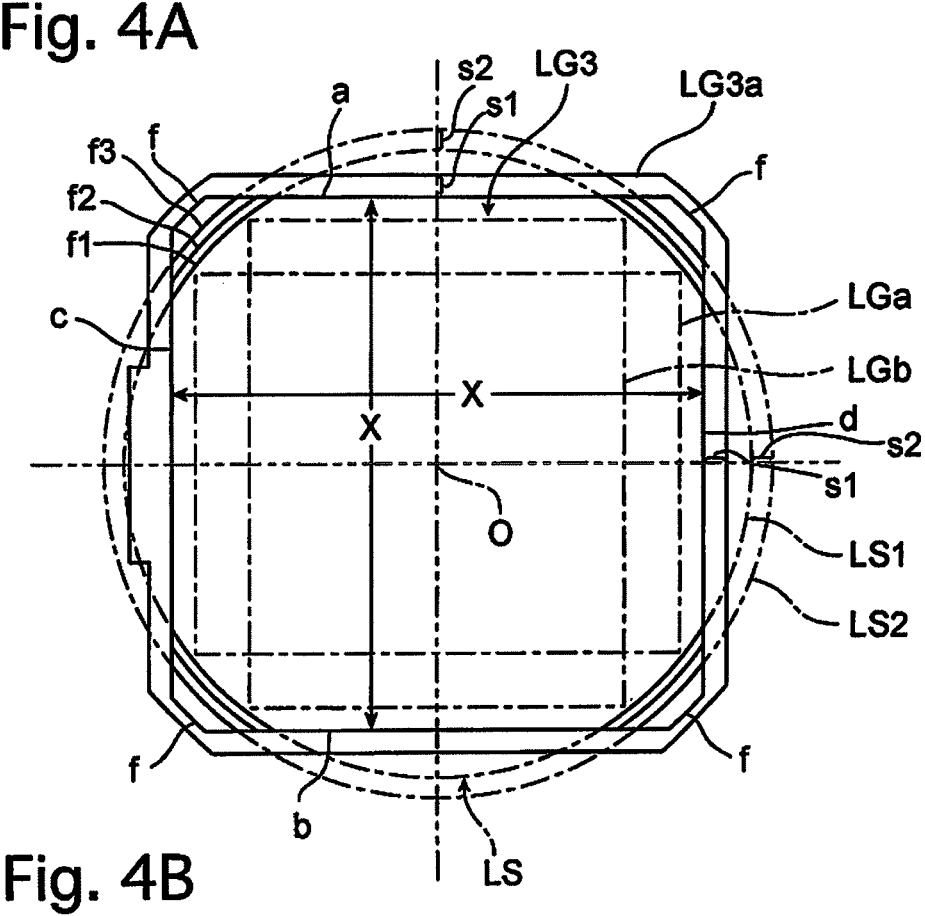
FIG. 4A is a front view illustrating a focus lens according to an embodiment of the invention.

FIG. 4A illustrates a front elevational shape of the third lens group LG3 which is a main feature of the present embodiment. In the third lens group LG3, the front elevational outer shape of the optical surface (optical area) has a substantially square shape which defines a non-circular optical surface (non-circular optical area). Therefore, imaging does not occur outside the periphery of the non-circular optical surface (i.e., only the non-circular optical surface has an imaging function), so that an edge portion (non-optical portion) LG3a having a shape substantially similar to that of the non-circular optical surface is integrally formed. An optical surface is defined as a surface on which the light contributing imaging to form an image area is incident. The boundary between the non-circular optical surface and the edge portion LG3a is defined by a pair of parallel sides 'a' and 'b', a pair of parallel sides 'c' and 'd' which is formed by rotating a pair of the parallel sides 'a' and 'b' by 90 degrees about the optical axis O; and arcs 'f' that have the optical axis O as the center thereof connect the ends of the sides 'a' and 'c', the ends of the sides 'c' and 'b', the ends of the sides 'b' and 'd', and the ends of the sides 'd' and 'a'. The arcs f are not essential; the shape of the optical surface can be such that straight lines are substituted for the arcs f or the optical surface can have a square shape where the sides 'a', 'b', 'c', and 'd' connect perpendicularly to each other. The front and rear sides of the third lens group LG3 have the same shaped non-circular optical surfaces. Furthermore, the front elevational shape of the optical surfaces of the lens groups other than the third lens group LG3 (i.e., the first and second lens groups LG1 and LG2) are circular.

Figure 8A:
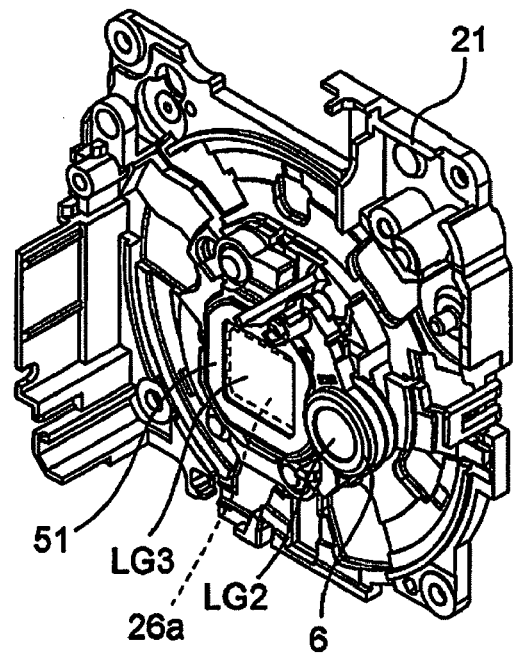
FIG. 8A is a perspective view illustrating a housing portion of the lens barrel unit in the horizontal position, in which the focus lens is installed, as view from the front (object side), according to the present invention.
Figure 8B:
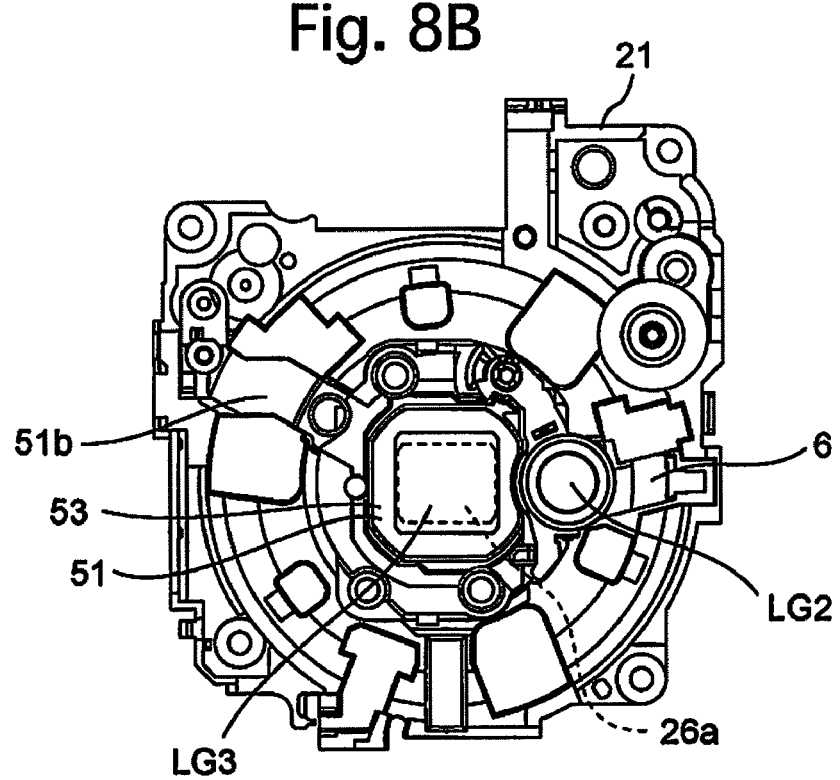
FIG. 8B is a front elevational view of the housing portion shown in FIG. 8A.
Figure 9A:
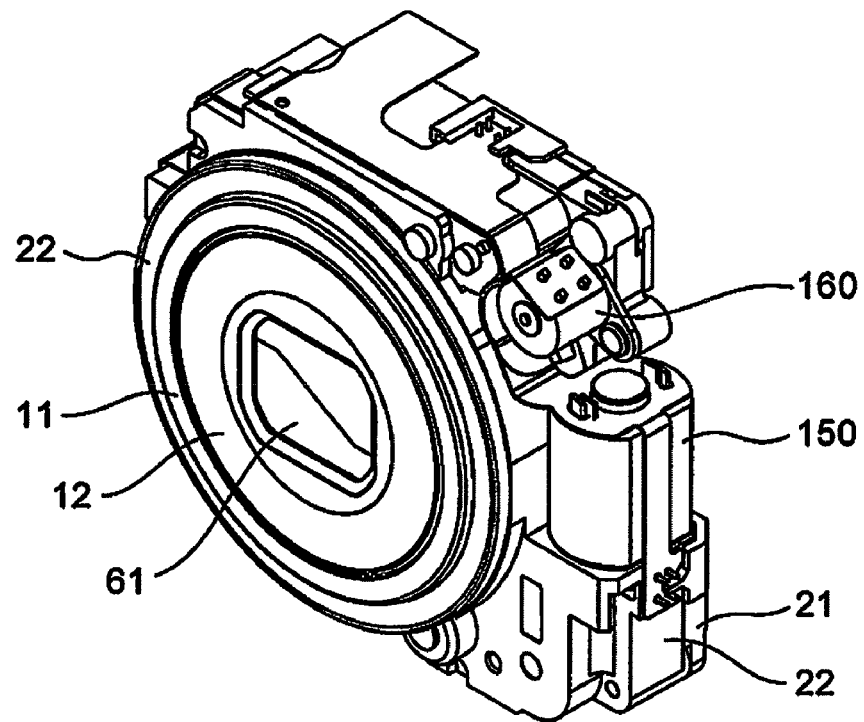
FIG. 9A is a perspective view illustrating the lens barrel unit in the vertical position, in which the focus lens is installed, as viewed from the front (object side), according to the present invention.
Figure 9B:
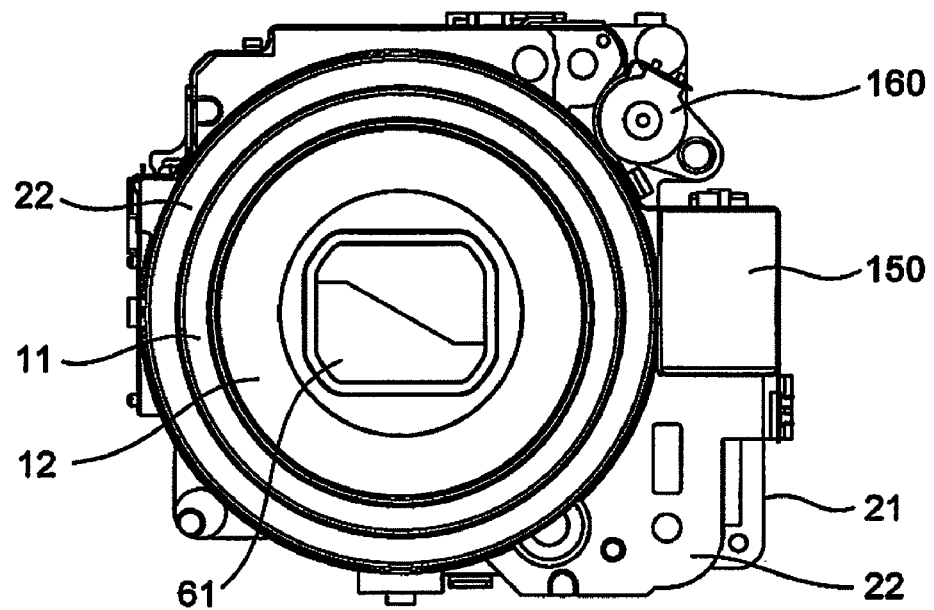
FIG. 9B is a front elevational view of the lens barrel unit shown in FIG. 9A.
Figure 10A:
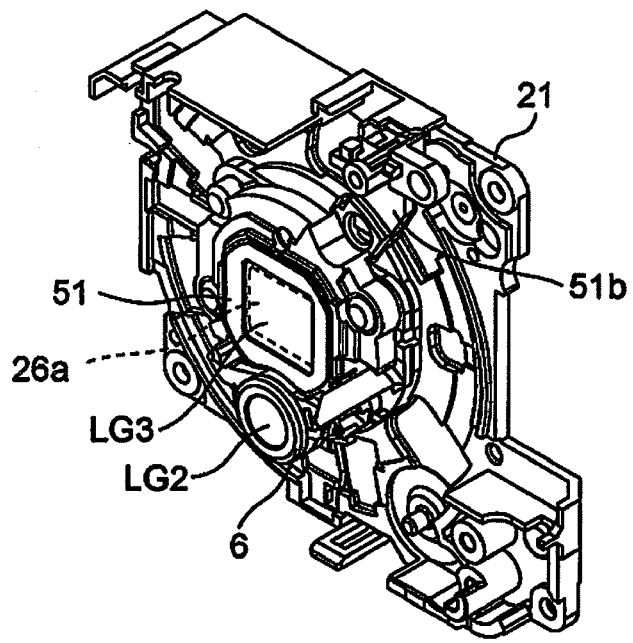
FIG. 10A is a perspective view illustrating a housing portion of the lens barrel unit in the vertical position, in which the focus lens is installed, as viewed from the front (object side), according to the present invention.
Figure 10B:
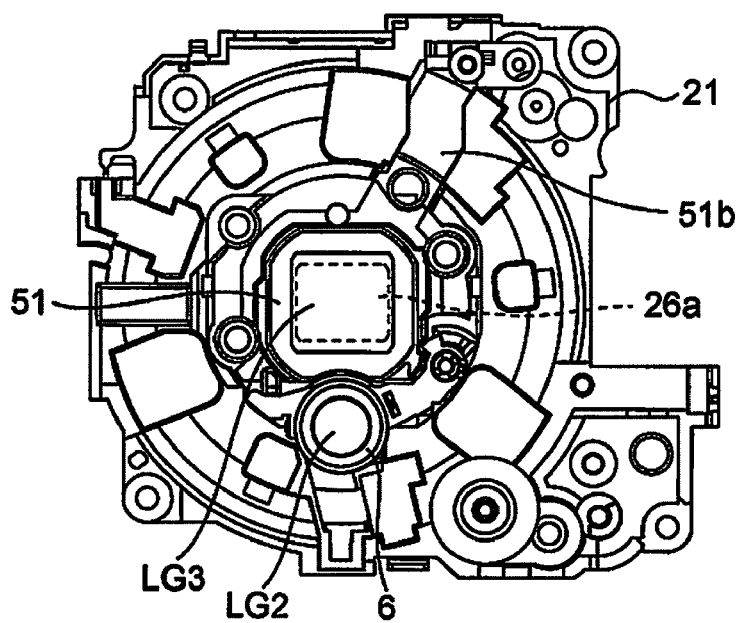
FIG. 10B is a front elevational view of the housing portion of the lens barrel unit shown in FIG. 10A.

Within the substantially square non-circular optical surface surrounded by the sides 'a', 'b', 'c', and 'd' and the arcs 'f', the rectangles indicated by single-dot chain lines denoted by symbols LGa and LGb designate two effective optical surface regions that respectively correspond to the effective light-receiving area (image sizes) 26a (FIG. 8B and FIG. 10B) of the image sensor 26. In the illustrated embodiment, the effective light-receiving area 26a has a rectangular shape with the aspect ratio of 4:3. The two effective optical surface regions LGa and LGb have the same shape (congruence) and have a positional relationship in which, if the one effective optical surface region is rotated by 90 degrees about the optical axis O, the two effective optical surface regions LGa and LGb overlap (coincide) each other. The horizontally-elongated effective optical surface region LGa corresponds to the effective light-receiving area 26a of the image sensor 26 according to the embodiment illustrated in FIGS. 1 through 3.

According to the present embodiment, a non-circular image area is formed by the non-circular optical surface of the third lens group LG3, so that the non-circular image area covers any one of the two effective optical surface regions LGa and LGb before and after the third lens group LG3 is rotated by 90 degrees about the optical axis O (i.e., the two effective optical surface regions LGa and LGb are enclosed within (fit within) the non-circular image area).

In addition, the distance X between a pair of the sides 'a' and 'b' and the distance X between a pair of the sides 'c' and 'd', which define the non-circular optical surface of the third lens group G3, are each smaller than a diameter of a reference circle LS1. The reference circle LS1 is defined by a circular optical surface of a reference circular lens LS, which is located at the same position with the same refractive power as that of the third lens group LG3 and forms the image circle which covers (is circumscribed about) the effective optical surface regions LGa and LGb (of the third lens group LG3) that respectively correspond to the effective light-receiving area 26a of the image sensor 26. The symbol LS2 denotes an edge portion (outer diameter thereof) of the reference circular lens LS. Note that, in FIG. 4A, within the non-circular optical surface of the third lens group LG3, three solid-line arcs f1, f2, and f3 located between the circles LS1 and LS2 are drawn; however, these solid lines are formed due to the formation of the third lens group LG3. Therefore, in the illustrated embodiment, the boundaries in the four corners of the non-circular optical surface of the third lens group LG3 are actually defined not by the arcs f but by the innermost arcs f1. The arcs f1 constitute parts of a circle that is centered on the optical axis of the third lens group LG3. Hence, the arcs f1 are located on the reference circle LS1 (circular optical surface) of the reference circular lens LS in this embodiment.

In this manner, since the non-circular optical surface of the third lens group LG3 has a substantially square shape which is formed by cutting off some of the portions of the outer shape of the circular optical surface (area) of the reference circular lens LS, if a distance s1 from the peripheral edge of the non-circular optical surface to the peripheral edge of the edge portion LG3a is set as the same as a distance s2 from the peripheral edge of optical surface (reference circle LS1) to the peripheral edge of the edge portion LS2 of the reference circular lens LS, the third lens group LG3 is smaller than the reference circular lens LS by an amount equal to above-mentioned the cut-off portions (FIG. 4A). Therefore, the third lens group LG3 can be formed lighter (in weight) than the reference circular lens LS.

Figure 4B:
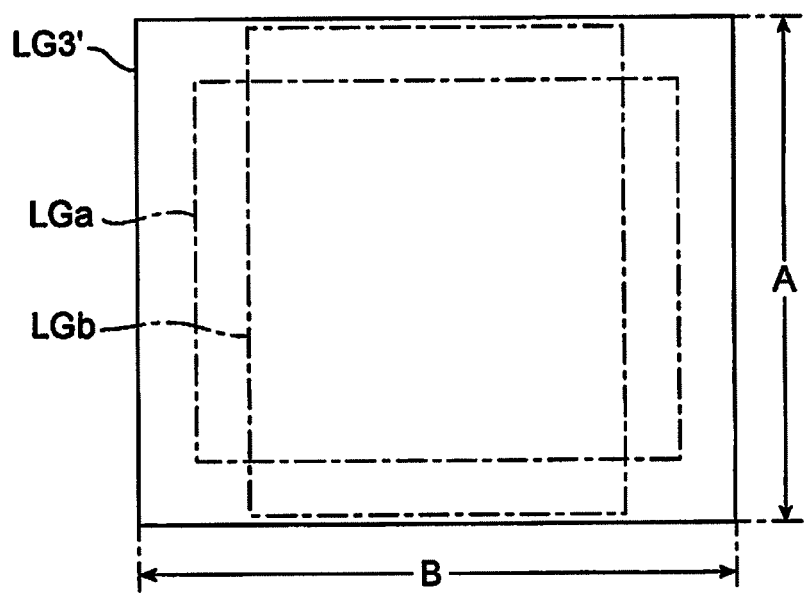
FIG. 4B is a front view illustrating a focus lens according to another embodiment of the invention.

Although the third lens group LG3 according to the embodiment illustrated in FIG. 4A is configured so that the front elevational outer shape of the non-circular optical surface is rotationally symmetrical by 90 degrees about the optical axis O, the basic outer shape of the optical surface of the third lens group LG3' may be configured to be a rectangular shape having short sides A and long sides B, for example, as illustrated in FIG. 4B. In this case, the long sides B are set to be in a range satisfying the following condition:

$A \leq B \leq A \times 1.2$, wherein the length of the short sides A are determined so that the short sides A cover the long sides of the effective light-receiving area 26a of the image sensor 26. In other words, the long sides B may have a length equal to or 1.2 times longer than that of the short sides A.

Figure 5:
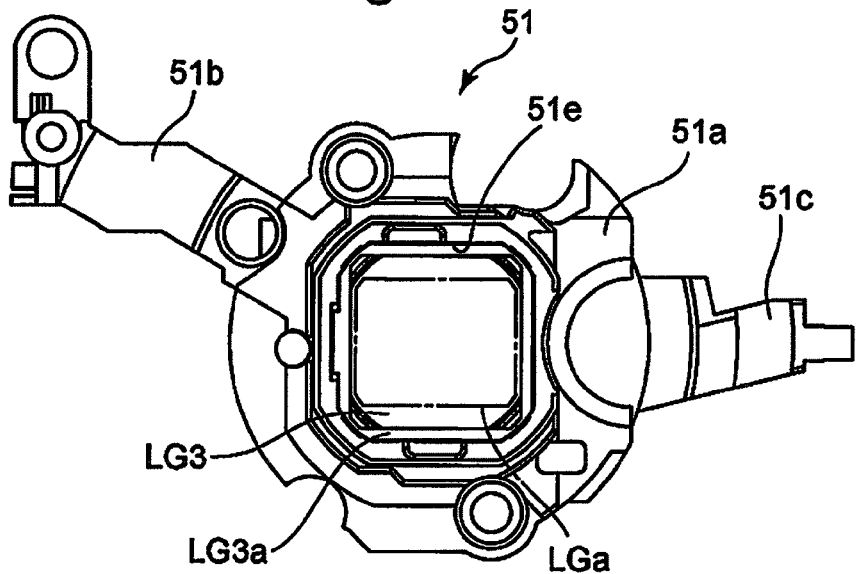
FIG. 5 is a front elevational view illustrating a lens moving frame in the horizontal position which is located at the rearmost position and holds the focus lens, according to the present invention.
Figure 6:
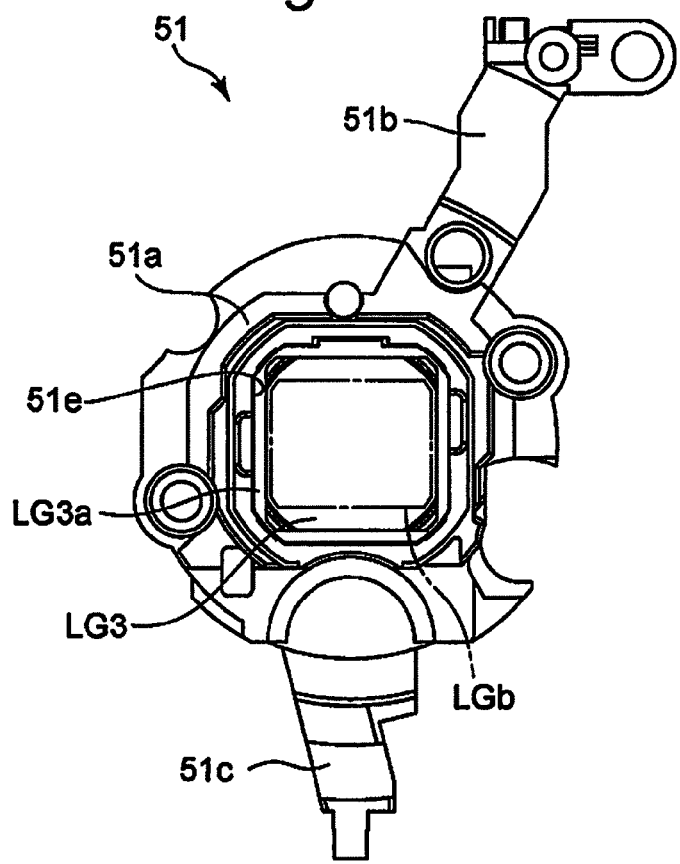
FIG. 6 is a front elevational view illustrating the lens moving frame in the vertical position, which holds the focus lens.
Figure 7A:
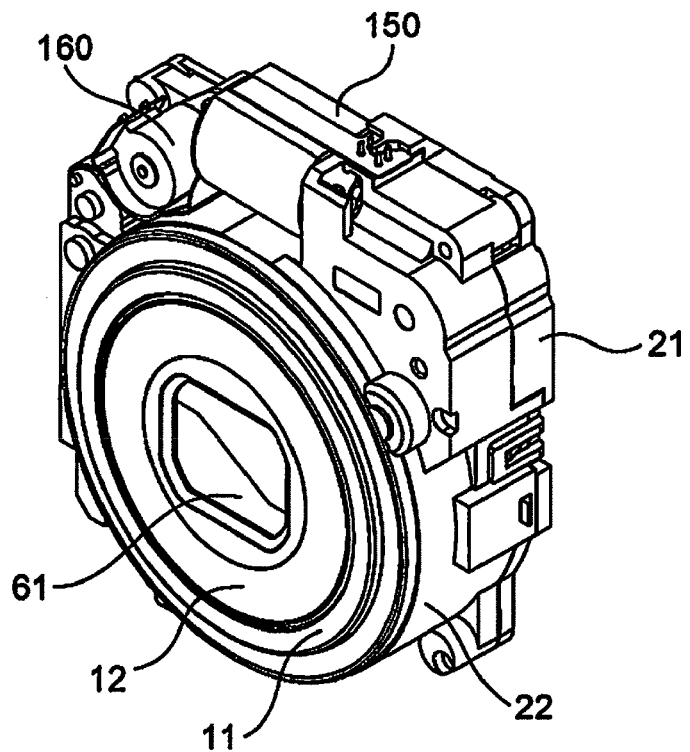
FIG. 7A is a perspective view illustrating a lens barrel unit in the horizontal position, in which the focus lens is installed, as viewed from the front (object side), according to the present invention.
Figure 7B:
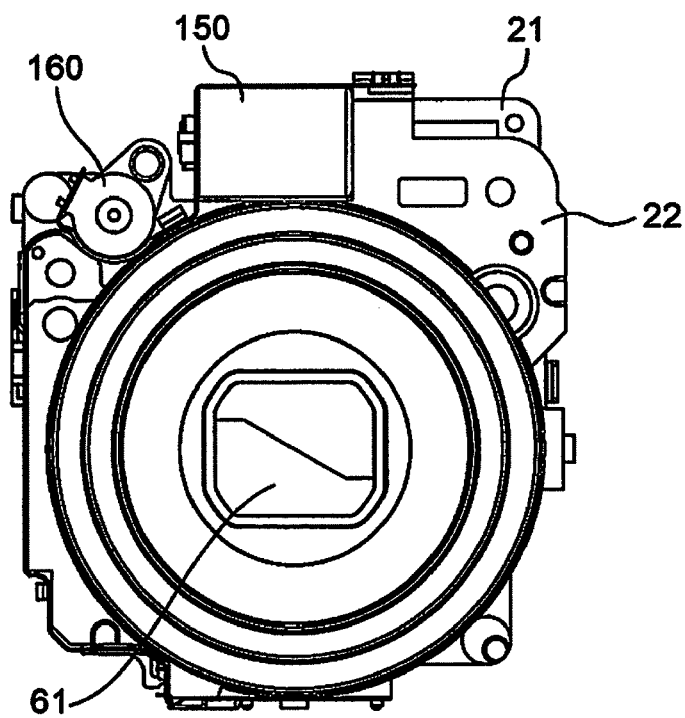
FIG. 7B is a front elevational view of the lens barrel unit shown in FIG. 7A.

FIGS. 5 and 6 illustrate front elevational views of the third-lens-group frame 51 in the horizontal and vertical positions, respectively, before and after the third-lens-group frame 51 is rotated about the optical axis by 90 degrees. When the third-lens-group frame 51 is in the horizontal position as shown in FIG. 5, the long sides of the effective optical surface region LGa of the image sensor 26 extend horizontally and the guide arms 51b and 51c extend in the substantially horizontal directions from the effective optical surface region LGa. Whereas, when the third-lens-group frame 51 is in the vertical position as shown in FIG. 6, the long sides of the effective optical surface region LGb of the image sensor 26 extend horizontally and the guide arms 51b and 51c extend in the substantially vertical directions from the effective optical surface region LGb. The lens holding cylindrical portion 51a of the third-lens-group frame 51 is provided with a frame portion 51e that holds the third lens group LG3 and is formed in a substantially square shape in which the corner portions thereof are rounded. The third lens group LG3 is inserted into the frame portion 51e to be held thereby. Since the optical surface of the third lens group LG3 has a square basic outer shape, although the third-lens-group frame 51 is rotated by units of 90 degrees about the optical axis O, the outer shape of the optical surface of the third lens group LG3 does not change. In other words, in the zoom lens barrel ZL, although the third lens group LG3 is rotated by 90 degrees about the optical axis O with respect to the image sensor 26, the contour of an image formed by the image pickup apparatus does not change.

FIGS. 7A through 8B illustrate the zoom lens barrel ZL in an embodiment where the third-lens-group frame 51 is directed (oriented) as illustrated in FIGS. 3 and 5. FIGS. 9A through 10B illustrate the zoom lens barrel ZL in an embodiment where the zoom lens barrel ZL illustrated in FIGS. 7A through 8B is rotated 90 degrees clockwise about the optical axis O, so that the third-lens-group frame 51 is in the vertical position as illustrated in FIG. 6. The zoom lens barrel ZL includes all the members illustrated in FIGS. 1 through 3, i.e., the housing 22 as the main structure, the image sensor holder 21 disposed in the rear portion of the housing 22, the image sensor 26 provided in the image sensor holder 21, the linearly movable barrel 12 assembled in the housing 22, the cam ring 11 and the lens barrier mechanism 61 assembled inside thereof, the linear guide ring 10, the second-lens-group unit 80, the shutter unit 100, the first lens group LG1, the second lens group LG2, the third lens group LG3, and the zoom motor 150 and the AF motor 160 mounted on the housing 22. The zoom motor 150 and the AF motor 160 are located at the central upper portion and the left side shoulder portion of the housing 22, respectively, with respect to a front elevational view thereof. In the embodiment illustrated in FIGS. 7A through 8B, the image sensor 26 is disposed so that the short sides of the effective light-receiving area 26a are directed in the upward/downward (vertical) directions and so that the barrier is opened and closed in the upward/downward directions with respect to FIG. 7B.

In the embodiment illustrated in FIGS. 9A through 10B, the entire zoom lens barrel ZL illustrated in FIGS. 7A through 8B is rotated 90 degrees clockwise about the optical axis O. However, the image sensor 26 and the lens barrier mechanism 61 are not rotated. In other words, the image sensor 26 is disposed in the image sensor holder 21 so that the short sides of the effective light-receiving area 26a are directed (oriented) in the upward/downward directions in FIGS. 9A through 10B likewise with the directions illustrated in FIGS. 7A through 8B, and the lens barrier mechanism 61 is disposed in the linearly movable barrel 12 so that the barrier is moved to be opened and closed in the upward/downward directions in FIGS. 9A through 10B. The zoom motor 150 and the AF motor 160 are located at the right side central portion and the right side shoulder portion of the housing 22 as seen in a front elevational view as shown in FIG. 9B. In this manner, even in the case where the zoom lens barrel ZL is rotated by 90 degrees, the image circle of the third lens group LG3 can cover the effective light-receiving area of the image sensor 26. Note that the lens barrier mechanism 61 may alternatively be rotated integrally with the zoom lens barrel ZL by 90 degrees while maintaining the arrangement illustrated in FIGS. 7A through 8B so that the barrier may be moved for opening and closing in the horizontal direction; however, in order to give a sense of security to a user, the barrier is configured so that the barrier can be moved for opening and closing in the upward/downward direction.

As described above, according to the present invention, since the optical surface of the third lens group 3GL which is provided closest to the image plane of the zoom lens barrel ZL has a substantially square shape which remains unchanged upon being rotated by 90 degrees about the optical axis O of the lens, although the zoom lens barrel ZL is rotated by units of 90 degrees with respect to a camera body and the image sensor 26, a normal object image having no vignetting can be projected onto the effective light-receiving area 26a of the image sensor 26.

In the present invention, although the third lens group LG3 is a single lens, a cemented lens may be alternatively used. In addition, although the illustrated embodiment describes a third lens group L3 which corresponds to an image sensor having an aspect ratio of 4:3 and can be rotated by units of 90 degrees, the present invention is not limited thereto. In addition, although the present invention is applied to a lens barrel where the lens that is provided closest to the image plane constitutes a focus lens, the present invention is not limited thereto. In addition, although the present invention is applied to the zoom lens that is configured of three lens groups as described herein, the present invention is not limited thereto; a zoom lens having two lens groups, four lens groups or more, a single focus (fixed focal length) lens, or the like, may be applied to the image pickup apparatus of the present invention.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. An image pickup apparatus comprising an image sensor and a photographing optical system, said image pickup apparatus forming an object image obtained through the photographing optical system onto an imaging surface of said image sensor, wherein said imaging surface includes an effective light-receiving area having a rectangular shape that is defined by short sides and long sides, wherein an optical surface of a lens that is provided closest to the image plane within the photographing optical system and which possesses an imaging function has a non-circular shape in a front elevational view, and wherein a boundary of the non-circular optical surface of said lens that is provided closest to the image plane includes two pairs of mutually parallel sides so that, upon said lens that is provided closest to the image plane being rotated about the optical axis relative to the imaging surface, an image area formed by said non-circular optical surface covers the rectangular effective light-receiving area of the imaging surface before and after rotation.

2. The image pickup apparatus according to claim 1, wherein, in the case where a circular lens having a circular optical surface that forms an image circle circumscribed about said rectangular effective light-receiving area is disposed at the same position as that of said lens that is provided closest to the image plane and has the same refractive power as that of said lens that is provided closest to the image plane, a distance between each of said two pairs of mutually parallel sides of said non-circular optical surface is smaller than a diameter of said circular optical surface of said circular lens.

3. The image pickup apparatus according to claim 1, wherein said two pairs of mutually parallel sides included in the boundary of the non-circular optical surface of said lens that is provided closest to the image plane are formed so that, upon the lens that is provided closest to the image plane being rotated by 90 degrees about the optical axis relative to the imaging surface, the image area formed by the non-circular optical surface covers the rectangular effective light-receiving area of the imaging surface.

4. The image pickup apparatus according to claim 1, wherein the distances between said two pairs of mutually parallel sides that define the boundary of the non-circular optical surface of the lens that is provided closest to the image plane are different from each other, wherein one of said distances between said two pairs of mutually parallel sides is 1.2 times larger than the other of said distances between said two pairs of mutually parallel sides.

5. The image pickup apparatus according to claim 1, wherein front elevational outer shape of said non-circular optical surface of said lens that is provided closest to the image plane remains the same upon being rotated by a predetermined angle about the optical axis.

6. The image pickup apparatus according to claim 5, wherein said predetermined angle is 90 degrees, and the front elevational outer shape of said non-circular optical surface of the lens that is provided closest to the image plane has a substantially square shape.

7. The image pickup apparatus according to claim 1, wherein said lens that is provided closest to the image plane comprises a focusing lens for carrying out a focus adjustment.

8. A digital camera comprising the image pickup apparatus according to claim 1.

* * * * *